US010456874B2

(12) United States Patent
Laux

(10) Patent No.: US 10,456,874 B2
(45) Date of Patent: Oct. 29, 2019

(54) MANGANESE-CONTAINING, COBALT-BASED HIGH-TEMPERATURE SOLDER ALLOY, POWDER, COMPONENT AND SOLDERING METHOD

(71) Applicant: SIEMENS AKTIENGESELLSCHAFT, München (DE)

(72) Inventor: Britta Laux, Berlin (DE)

(73) Assignee: SIEMENS AKTIENGESELLSCHAFT (DE)

( * ) Notice: Subject to any disclaimer, the term of this patent is extended or adjusted under 35 U.S.C. 154(b) by 378 days.

(21) Appl. No.: 15/109,143

(22) PCT Filed: Dec. 17, 2014

(86) PCT No.: PCT/EP2014/078169
§ 371 (c)(1),
(2) Date: Jun. 30, 2016

(87) PCT Pub. No.: WO2015/104154
PCT Pub. Date: Jul. 16, 2015

(65) Prior Publication Data
US 2016/0325385 A1 Nov. 10, 2016

(30) Foreign Application Priority Data
Jan. 8, 2014 (DE) .................. 10 2014 200 121

(51) Int. Cl.
| | | |
|---|---|---|
| *B23K 1/00* | (2006.01) | |
| *C22C 30/00* | (2006.01) | |
| *B23K 35/30* | (2006.01) | |
| *C22C 19/00* | (2006.01) | |
| *C22C 19/07* | (2006.01) | |
| *B23K 1/19* | (2006.01) | |
| *B23K 35/02* | (2006.01) | |
| *C22F 1/10* | (2006.01) | |
| *C22C 1/04* | (2006.01) | |

(52) U.S. Cl.
CPC ........ *B23K 35/3046* (2013.01); *B23K 1/0018* (2013.01); *B23K 1/19* (2013.01); *B23K 35/0244* (2013.01); *C22C 19/007* (2013.01); *C22C 19/07* (2013.01); *C22F 1/10* (2013.01); *C22C 1/0425* (2013.01)

(58) Field of Classification Search
CPC ...... B23K 35/3046; B23K 1/00; B23K 1/002; B23K 1/0018; C22C 19/07; C22C 30/00; C22F 1/10
USPC .................. 148/528; 420/434, 435
See application file for complete search history.

(56) References Cited

U.S. PATENT DOCUMENTS

| | | | |
|---|---|---|---|
| 6,077,615 A | | 6/2000 | Yada |
| 7,335,427 B2* | | 2/2008 | Sathian ................. B22F 1/0003 419/8 |
| 8,125,305 B2* | | 2/2012 | Saito ....................... H01F 17/06 29/602.1 |
| 2006/0051234 A1 | | 3/2006 | Pike, Jr. |
| 2006/0249231 A1* | | 11/2006 | Bezerra .............. B23K 35/0244 148/425 |
| 2008/0185075 A1 | | 8/2008 | Ishida et al. |
| 2011/0041966 A1 | | 2/2011 | Ishida |
| 2013/0028783 A1* | | 1/2013 | Ott ........................ B23K 35/30 420/445 |
| 2013/0299562 A1 | | 11/2013 | Piegert |

FOREIGN PATENT DOCUMENTS

| | | |
|---|---|---|
| CN | 1215131 A | 4/1999 |
| CN | 1241218 A | 1/2000 |
| CN | 1743483 A | 3/2006 |
| CN | 101287849 A | 10/2008 |
| CN | 102443721 A | 5/2012 |
| DE | 2020521 A1 | 2/1971 |
| DE | 69108290 T2 | 11/1995 |
| EP | 2022599 A1 | 2/2009 |
| JP | S52148416 A | 12/1977 |
| JP | 2009228024 A | 10/2009 |
| WO | 97/10368 * 3/1997 ............. B23K 35/30 |
| WO | WO9710368 A1 | 3/1997 |
| WO | WO9845491 A1 | 10/1998 |

OTHER PUBLICATIONS

International Search Report; PCT/EP2014/078169; International Filing Date: Dec. 17, 2014; 2 pgs.

* cited by examiner

*Primary Examiner* — Patricia L. Hailey
(74) *Attorney, Agent, or Firm* — Schmeiser, Olsen & Watts, LLP

(57) ABSTRACT

A manganese-containing, cobalt-based alloy with zirconium, tantalum and carbon, and good cohesive joint connections, is provided.

13 Claims, No Drawings

MANGANESE-CONTAINING, COBALT-BASED HIGH-TEMPERATURE SOLDER ALLOY, POWDER, COMPONENT AND SOLDERING METHOD

CROSS-REFERENCE TO RELATED APPLICATIONS

This application claims priority to PCT Application No. PCT/EP2014/078169, having a filing date of Dec. 17, 2014, based on DE Application No. 102014200121.8, having a filing date of Jan. 8, 2014, the entire contents of which are hereby incorporated by reference.

FIELD OF TECHNOLOGY

The following relates to a manganese-containing, cobalt-based alloy which can be used in soldering, to a powder, a component and a soldering method.

BACKGROUND

On account of its high thermal conductivity in comparison to nickel-based alloys, the stationary components of the first turbine stage are made in part of cobalt-based alloys such as MAR-M 509. This is the case both for static gas turbines and for aero engines.

For cohesive joining connections at these components, which are made in the form of high-temperature soldered joints, the primary materials are nickel-based solders. These conventional nickel-based solders contain boron and/or silicon as melting point depressant. As a consequence of the different thermal expansion coefficients of cobalt and of nickel, high residual stresses can arise in the region of the joining zone, which can lead to a weakening of the assembly. In addition, in the case of wide joining gaps and short soldering process times, brittle phases can precipitate out in the soldering gap, which phases can additionally impair the mechanical integrity.

Hitherto, for joining Co-based materials, use was made of conventional nickel-based solders. In that context, a significant impairment of the mechanical properties in the region of the joining zone was accepted.

SUMMARY

An aspect relates to a solder alloy, a powder, a component and a soldering method, with which it is possible to solder cobalt-based alloys at high temperatures and to produce good assemblies.

The novel cobalt alloy makes the use of conventional nickel solders unnecessary. In addition, the novel solders preferably do not require the typical melting point depressants boron and silicon, which can lead to the formation of brittle secondary phases.

The machinability of manganese-containing cobalt solders in a temperature range <1473K allows the joining process to be integrated into the heat treatment of the cobalt components. This saves time and costs.

The description shows merely exemplary embodiments of the invention.

It is proposed to work with novel boron- and silicon-free cobalt-based solders which contain manganese (Mn) as the main melting point depressant. Other melting point depressants gallium (Ga) and germanium (Ge) are also preferably absent.

The cobalt-based solder alloy has at least: zirconium (Zr), particularly 8% by weight-16% by weight, very particularly 15% by weight, tantalum (Ta), particularly 6% by weight-10% by weight, very particularly 8% by weight, carbon (C), particularly 0.5% by weight-1.5% by weight, very particularly 1% by weight, manganese (Mn), particularly 8% by weight-12% by weight, very particularly 10% by weight, optionally titanium (Ti).

The starting system is preferably the quaternary system Co-15Zr-8Ta-1C (in percent by weight), which is alloyed with manganese (Mn).

Manganese (Mn) is highly soluble in the cobalt matrix, such that the precipitation of brittle phases can be prevented. Addition of 10% by weight of manganese (Mn) allows the melting point to be depressed to <1473K.

Furthermore, small quantities of titanium (Ti), from 0.5% by weight to 5% by weight, can be admixed to further lower the melting point. In addition, titanium, alongside tantalum (Ta), functions in the cobalt matrix as a carbide former, and thus strengthens the joining zone.

Substrates which are soldered using the cobalt-based solder alloy differ markedly, i.e. in particular they have other elements or in particular have no manganese.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A cobalt-based solder alloy comprising:
   8% by weight—16% by weight of zirconium (Zr);
   6% by weight—10% by weight of tantalum (Ta);
   0.5% by weight—1.5% by weight of carbon (C),
   8% by weight—12% by weight of manganese (Mn);
   at least 0.5% by weight of titanium (Ti); and
   having no boron (B), no silicon (Si), no germanium (Ge) and no gallium (Ga).

2. The cobalt-based solder alloy as claimed in claim 1, including 15% by weight of zirconium (Zr).

3. The cobalt-based solder alloy as claimed in claim 1, including 8% by weight of tantalum (Ta).

4. The cobalt-based solder alloy as claimed in claim 1, including 1% by weight of carbon (C).

5. The cobalt-based solder alloy as claimed in claim 1, including 10% by weight of manganese (Mn).

6. The cobalt-based solder alloy as claimed in claim 1, including 1% by weight of titanium (Ti).

7. The cobalt-based solder alloy as claimed in claim 1, consisting of zirconium (Zr), tantalum (Ta), carbon (C), manganese (Mn), cobalt (Co) and titanium (Ti).

8. The cobalt-based solder alloy as claimed in claim 1, consisting of zirconium (Zr), tantalum (Ta), carbon (C), manganese (Mn), cobalt (Co) and titanium (Ti).

9. The cobalt-based solder alloy as claimed in claim 1, having at most 5% by weight of titanium (Ti).

10. A powder comprising the cobalt-based solder alloy as claimed in claim 1.

11. A component comprising the cobalt-based solder alloy as claimed in claim 1.

12. A method comprising: soldering a substrate using the cobalt-based solder alloy as claimed in claim 1.

13. The method as claimed in claim 12, wherein the soldering the substrate is carried out with a heat treatment for a cobalt-based alloy that differs from a heat treatment for an alloy that has no manganese.

* * * * *